Figure 1:
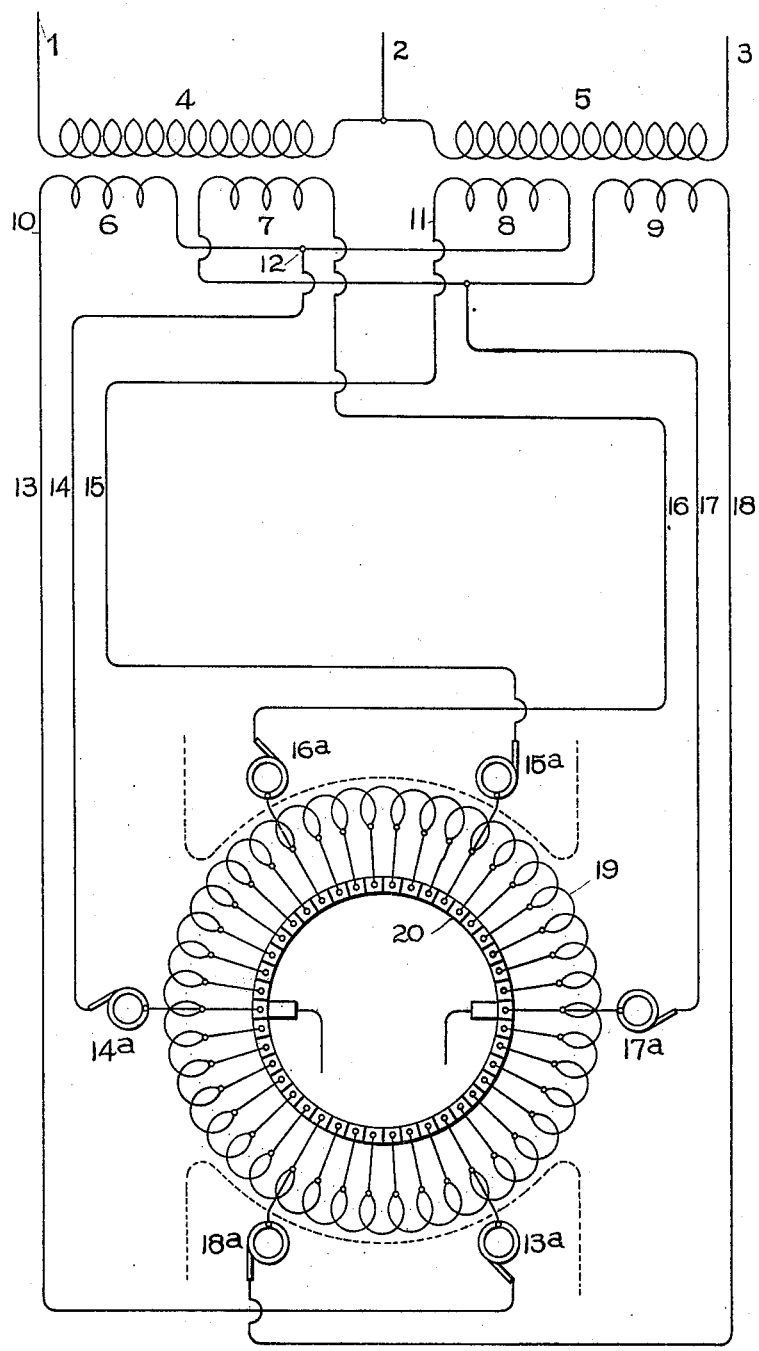

No. 679,006. Patented July 23, 1901.
E. W. RICE, Jr.
SYSTEM OF ELECTRICAL DISTRIBUTION.
(Application filed Dec. 12, 1899.)
(No Model.) 3 Sheets—Sheet 1.

Witnesses
Lewis B. Abell
Benjamin B. Hull

Inventor
Edwin W. Rice Jr.
by Albert G. Davis
Atty.

No. 679,006. Patented July 23, 1901.
E. W. RICE, Jr.
SYSTEM OF ELECTRICAL DISTRIBUTION.
(Application filed Dec. 12, 1899.)
(No Model.) 3 Sheets—Sheet 2.

Witnesses
Lewis P. Abell
Benjamin B. Hull

Inventor.
Edwin W. Rice Jr.
by Albert G. Davis
Atty

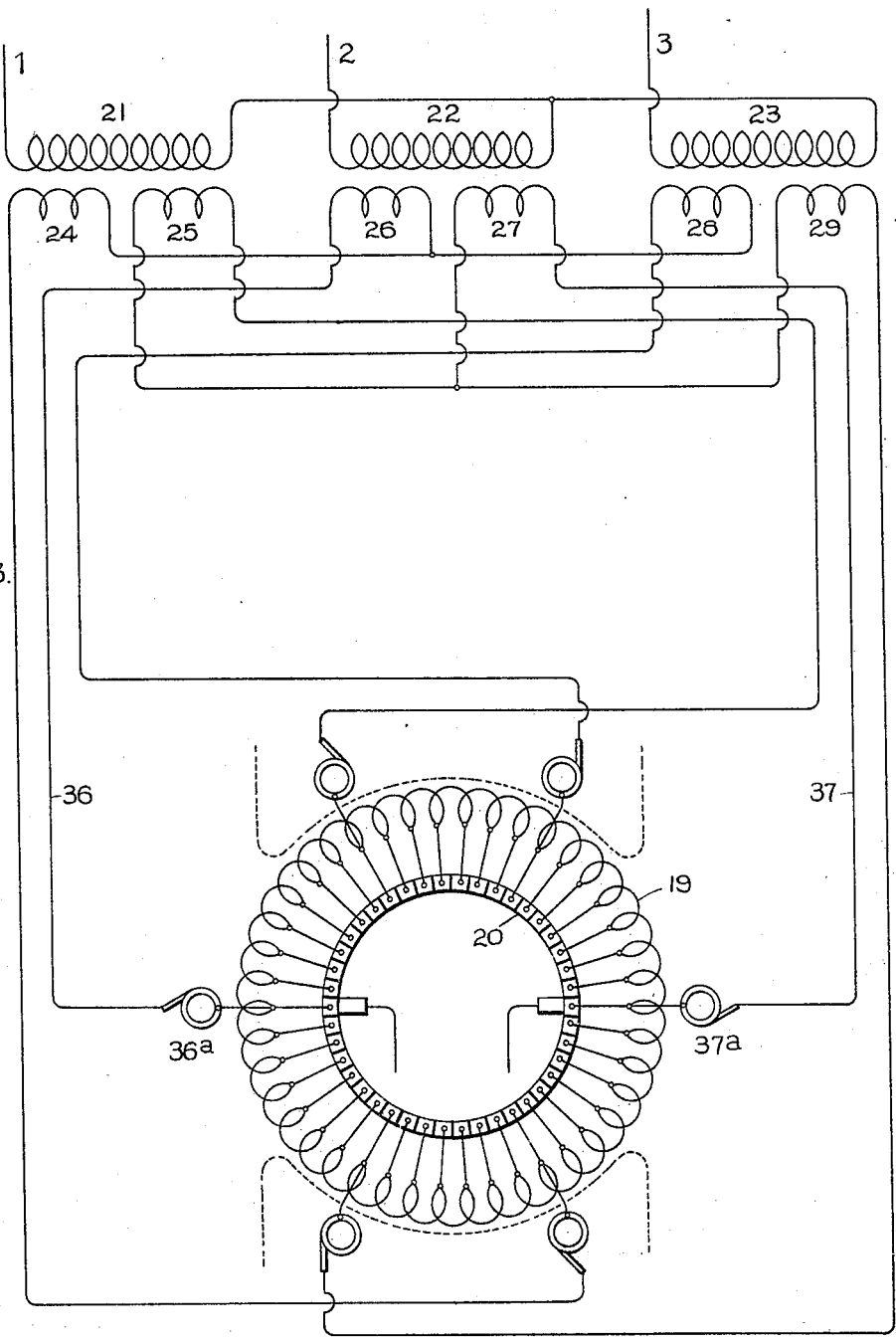

UNITED STATES PATENT OFFICE.

EDWIN W. RICE, JR., OF SCHENECTADY, NEW YORK, ASSIGNOR TO THE GENERAL ELECTRIC COMPANY, OF NEW YORK.

SYSTEM OF ELECTRICAL DISTRIBUTION.

SPECIFICATION forming part of Letters Patent No. 679,006, dated July 23, 1901.

Application filed December 12, 1899. Serial No. 740,054. (No model.)

*To all whom it may concern:*

Be it known that I, EDWIN W. RICE, Jr., a citizen of the United States, residing at Schenectady, county of Schenectady, State of New York, have invented certain new and useful Improvements in Systems of Electrical Distribution, (Case No. 992,) of which the following is a specification.

My invention relates to the distribution of energy by means of alternating currents, and comprises certain improvements in a system wherein an alternating-current dynamo-electric machine of a given number of phases may be connected to transmission-leads or distributing-wires carrying currents of a different number of phases. The embodiment which I have herein chosen to illustrate my invention consists of a rotary converter with six alternating-current leads connected to two separate sets of three-phase leads, the electromotive forces acting in one set of the three-phase leads being displaced, respectively, from those operating in the other set of three-phase leads by an angle of sixty degrees. In cases where the rotary converter is utilized for changing alternating currents to continuous currents these two sets of three-phase leads are connected, respectively, to independent sets of three-phase transformer secondaries, the primary circuits of both sets of transformer secondaries being supplied from a single set of three-phase mains. In case the function of the rotary converter is reversed by causing it to convert direct current into alternating current the windings of the three-phase transformers which before acted as secondaries will in this case become primaries, while the windings which before operated as primaries become secondaries. By means of the specific arrangement thus described it will be seen that three-phase alternating currents may be converted into direct current or direct current into three-phase alternating current through the intervention of six-phase alternating currents.

This system has certain distinct advantages. When starting the rotary converter from the direct-current side, it is unnecessary to open the leads connecting the alternating-current side of the converter with the transformer-windings, as has heretofore been necessary where only a single set of transformer-windings was employed. In the latter case if the mains were not opened the transformer-windings would furnish short circuits for the direct-current mains if the commutator-brushes of the converter happened to be in a position on or near those commutator-segments in close connection to the tapping-in points of the alternating-current armature-leads. Moreover, where two separate sets of transformer-windings are employed these windings may be connected either in delta or gamma and at the same time preserve the six-phase relation of connection of the two sets of three-phase alternating-current conductors to the winding of the rotary converter. This latter advantage is absent where but a single set of three-phase transformer-windings is employed.

In its broader aspects, however, my invention is not limited to the specific arrangement of parts which I have described for purposes of illustration, but comprises certain broad features of invention, as I have hereinafter pointed out in the claims forming part of this specification, to which reference is to be made in determining the scope of my invention.

The accompanying drawings, taken in connection with the following description, will aid in the understanding of the more specific nature of the system embodying my invention.

Figure 2:
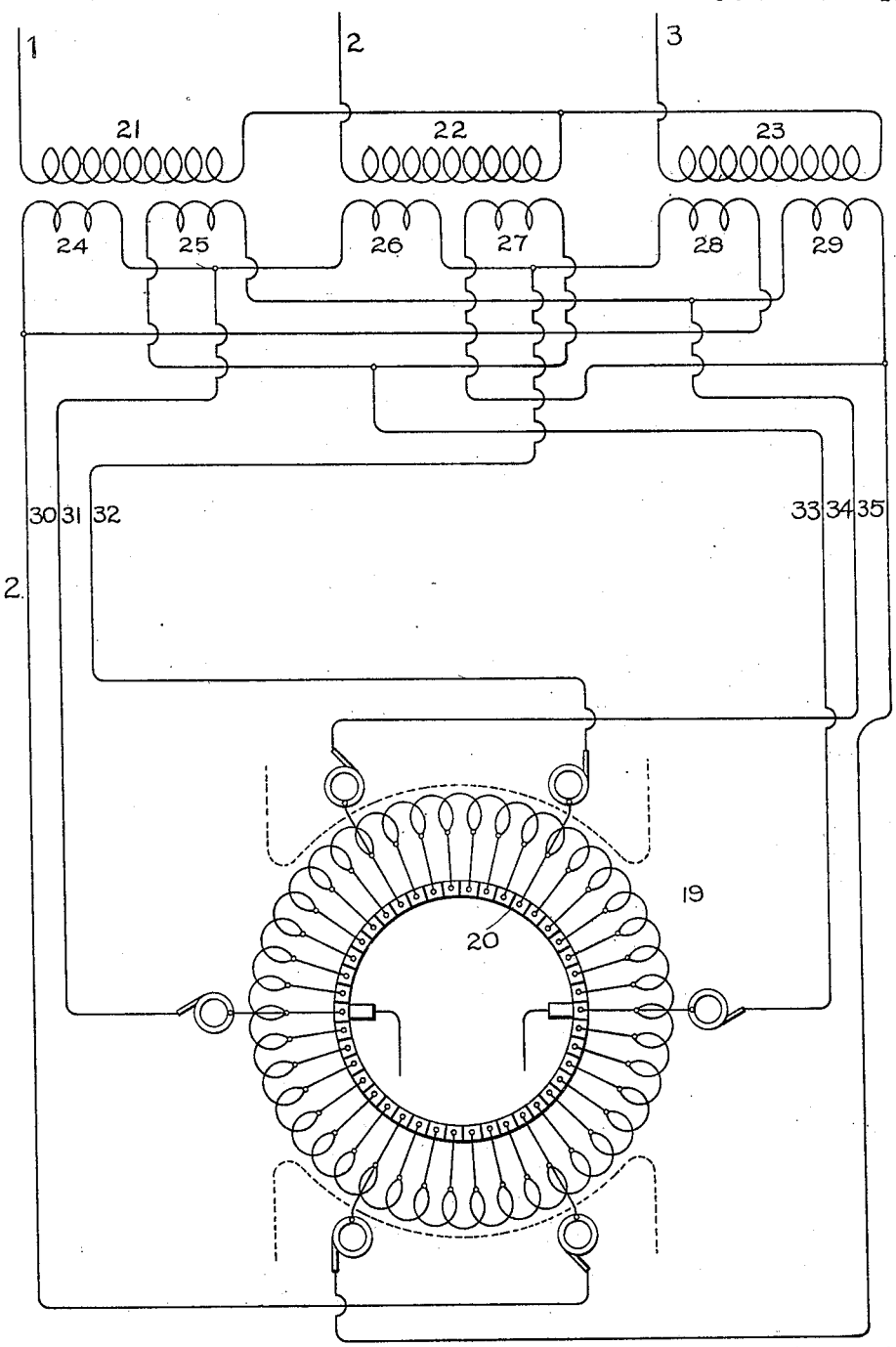

In the drawings, Figures 1, 2, and 3 each represent a rotary converter inductively connected to three-phase leads.

In Fig. 1 the lines 1 2 3 are intended to represent conductors arranged to carry three-phase currents. Between the lines 1 2 and 2 3, respectively, transformer windings or coils 4 5 are connected. These windings may be placed on separate cores or on interrelated cores, as may be desired; but in either case I provide a plurality of separate and distinct windings in inductive relation to each of the windings 4 and 5. Thus, as shown in Fig. 1, the windings 6 and 7 are in inductive relation to the winding 4, while the windings 8 and 9 are in inductive relation to the winding 5. I have purposely refrained from positively designating any of these windings as "primary" or "secondary," since it is evident that under suitable conditions they may perform either function. Supposing for the moment, however, that the windings 4 5 act as primaries, then it will be evident that cophasal electromotive forces will be induced in the windings 6 and 7, which now become secondaries, while similar cophasal electromotive forces displaced in phase by one-third of a period from those generated in the secondaries 6 7 will be set up in the windings 8 9. In order to secure two separate sets of three-phase currents, I suitably connect coöperating pairs of secondary coils to corresponding sets of three-phase mains. This connection is effected, as shown in the drawings, by connecting the secondary 6 in series with the secondary 8 and extending conductors from the free terminals 10 11 and the intermediate connection 12 to form the three-phase mains 13 14 15, as will readily be seen. In a similar way the secondaries 7 and 9 are connected to the separate three-phase mains 16, 17, and 18.

Although there are but two secondary coils supplying each set of three-phase mains, it will be evident that there are three phase-displaced electromotive forces operating upon each of said sets of mains, the electromotive force induced in the secondary 6, for example, forming one, the electromotive force induced in the secondary 8 forming another, while the resultant of the two forms a third. The same relation of electromotive forces exists with respect to the secondaries 7 and 9, except that they are reversely connected with respect to the connection of the secondaries 6 and 8, as will readily be seen from the diagram.

At 19 I have indicated diagrammatically an armature-winding for a rotary converter, the alternating leads being tapped in at 13ª to 18ª, inclusive, the leads 13ª, 14ª, and 15ª being connected to equispaced points in the winding, while the leads 16ª 17ª 18ª are connected to other equispaced points in the winding angularly displaced from the points of connection of the first set of leads, the angular displacement in this particular case being one-sixth of the polar pitch.

The commutator of the rotary converter is shown at 20 and is appropriately connected with the armature-winding.

The arrangement shown corresponds to the connections for a bipolar machine, in which the commutator-brushes bear upon the commutator at diametrically opposite points. In the drawings these brushes are shown as bearing upon commutator-segments connected to the same points in the armature-winding at which the alternating leads 14ª and 17ª are tapped in, so that by tracing the circuits leading from 14ª and 17ª the advantages of separate sources of alternating-current supply will be rendered apparent. In tracing out connections it will be noted that the lead 17ª is connected to a set of transformer-windings electrically independent of that to which the lead 14ª is connected, thus rendering a short circuit across the direct-current brushes impossible.

Fig. 2 differs from Fig. 1 in that there are three transformer-windings 21 22 23 connected to the mains 1 2 3, each of these windings being inductively related to a plurality of separate and independent windings. Thus windings 24 25 are in inductive relation to winding 21, windings 26 27 to the winding 22, and windings 28 29 to the winding 23. Assuming, as before, that the windings connected to the mains 1 2 3 act as primaries, then it will be observed that the construction shown provides two sets of secondaries each carrying three electromotive forces displaced in phase from each other by one-third of a period. One set of secondaries 24, 26, and 28 is connected in delta with three-phase conductors 30 31 32, leading therefrom and connected to points equidistant from each other in the armature-winding 19 of the rotary converter. A separate set of secondaries 25, 27, and 29 is similarly joined in delta and connected through leads 33, 34, and 35 to points in the winding 19 midway between the points of connection of the leads 30 31 32, as will readily be understood by inspection of the drawings without further detailed description. It is to be noted, however, that the connection of one set of windings in delta is made in a manner exactly the reverse of that of the other set in order that the electromotive forces impressed on the armature of the rotary converter may bear a six-phase relation to each other to correspond with the six-phase mode of connection of the same.

Fig. 3 differs from Fig. 2 only in that the secondaries 24 to 29, inclusive, are joined so as to form two separate gamma connections, the free terminals of the secondaries being so connected to the armature-winding 19 as to generate therein symmetrically-dephased magnetomotive forces, this result being effected by reversing the connection of one set of windings with respect to the other. Thus, for example, the free end of the secondary 26 belonging to one of the sets of three-phase secondaries is connected through the lead 36 to the terminal 36ª of the armature-winding 19, while the diametrically opposite point 37ª of the armature-winding 19 is connected through the lead 37 to the secondary 27, in which electromotive forces are generated of the same phase as those produced in the secondary 26, the connection, however, being made to that end of the secondary 27 which is opposite to that corresponding to the connection of the main 36 to the coil 26. The electromotive forces acting upon the mains 36 and 37 are thus reversed in phase. The other secondary coils are similarly connected, thus producing a relation of electromotive forces represented by six equiangularly-displaced lines coming together at a single point. In Fig. 2 the relation of electromotive forces is somewhat similar, but is represented in diagram by two superposed equilateral triangles having the same center of gravity, but angularly displaced from each other by sixty degrees.

What I claim as new, and desire to secure by Letters Patent of the United States, is—

1. The combination of a dynamo-electric machine, and a plurality of distinct multiphase circuits directly connected to a single closed winding on said machine and inductively connected to a single multiphase circuit.

2. The combination of a dynamo-electric machine, leads connected to a single closed winding on said machine and to two independent sets of three-phase transformer-windings, and an inductive connection between a three-phase circuit and said transformer-windings.

3. The combination of a multiphase circuit inductively connected to two, separate, relatively phase-displaced, three-phase circuits, and a dynamo-electric machine having a closed winding connected to said three-phase circuits.

4. The combination of two separate sources of multiphase current, and a dynamo-electric machine having a winding fed from said sources so as to generate magnetomotive forces having a greater number of phases than either of said sources.

5. The combination of primary exciting-circuits of different phase, a plurality of secondary circuits inductively related to each of said primary circuits, and a dynamo-electric machine having a single closed winding fed from all of said secondary circuits.

6. The combination of two primary coils supplied with currents of different phase, two secondary coils inductively related to each primary coil, conductors connecting pairs of secondary coils of different phase together in series, thereby forming two separate sources of multiphase current, a dynamo-electric machine, connections from equispaced points in a winding on said machine to one of said sources, and connections from other equispaced points in said winding to another of said sources.

7. The combination of primary coils supplied with alternating currents of differing phase, secondary coils inductively related to each primary coil, conductors connecting pairs of secondary coils of different phase together in series, thereby forming separate sources of multiphase current, a dynamo-electric machine, and connections from equispaced points on a winding on said machine to said sources of multiphase current.

8. The combination of primary coils supplied with multiphase current, secondary coils inductively related to each primary coil, means for connecting secondary coils of different phase together, thereby forming separate sources of multiphase current, a dynamo-electric machine, connections from equispaced points in a winding on said machine to one of said sources, and connections from other equispaced points in said winding to another of said sources.

9. The combination with a rotary converter, of independent sets of three-phase transformer-windings, connections from one of said sets to points in a winding of said rotary converter, and connections from another set of said transformer-windings to other points in the said windings of said rotary converter.

10. The combination of two independent sets of three-phase transformer-windings, and a rotary converter having a winding connected to said transformer-windings so as to generate six-phase magnetomotive forces.

11. The combination of two sets of series-connected transformer-windings, means for generating three-phase electromotive forces in said windings, a rotary converter having a closed armature-winding, and connections from equispaced points in said winding to the free terminals of said transformer-windings and to points in the connections between said transformer-windings.

12. The combination of two sources of three-phase current, a rotary converter, connections from one of said sources to points in the armature-winding of said rotary converter displaced from each other by one-third of the polar pitch, and other connections, from the other source of three-phase current, to points in said winding between the points of connection of the first source.

13. The combination of a plurality of independent multiphase circuits, and a dynamo-electric machine having a single closed winding connected to said circuits, the points of connection between the winding and one of said circuits being non-identical with the points of connection between said winding and another of said circuits.

14. The combination of a dynamo-electric machine having a closed winding thereon, and connections between said closed winding and a plurality of relatively phase-displaced multiphase circuits.

15. The combination with an alternating-current machine provided with a commutator, of sets of three-phase circuits, and connections between said sets of circuits and a winding of said machine, the points of connection to said winding of one set being non-identical with the points of connection of another set.

In witness whereof I have hereunto set my hand this 11th day of December, 1899.

EDWIN W. RICE, JR.

Witnesses:
BENJAMIN B. HULL,
MABEL E. JACOBSON.